United States Patent

Durden et al.

[11] Patent Number: 5,920,626
[45] Date of Patent: Jul. 6, 1999

[54] ANALOG/DIGITAL SYSTEM FOR TELEVISION SERVICES

[75] Inventors: Gregory S. Durden, Jonesboro; Douglas L. Ross, Alpharetta; William E. Wall, Atlanta, all of Ga.

[73] Assignee: Scientific-Atlanta, Inc., Norcross, Ga.

[21] Appl. No.: 08/770,515

[22] Filed: Dec. 20, 1996

[51] Int. Cl.$^6$ ............... H04N 7/167; H04L 9/00
[52] U.S. Cl. ............... 380/10; 380/9; 380/15; 380/19; 380/20; 380/23; 380/25; 380/49; 348/6; 348/10; 348/11; 348/12; 455/3.1; 455/3.2; 455/4.1; 455/4.2; 455/5.1; 455/6.1; 455/6.2; 455/6.3
[58] Field of Search ............... 380/10, 19, 20, 380/49, 50, 59, 15, 9, 23, 25; 348/6, 7, 8, 9, 10, 11, 12; 455/3.1, 3.2, 4.1, 4.2, 5.1, 6.1, 6.2, 6.3

[56] References Cited

U.S. PATENT DOCUMENTS 5,073,930  12/1991  Green et al. ............... 380/10
5,642,151  6/1997  Nusbickel et al. ............... 348/6
5,787,335  7/1998  Novak ............... 348/10 X

*Primary Examiner*—Bernarr E. Gregory
*Attorney, Agent, or Firm*—Kenneth M. Massaroni; Hubert J. Bernhardt; Kelly A. Gardner

[57] ABSTRACT

A combined IRD scrambler/modulator is provided in a headend. A service provider transmits a digital program signal in a digital data stream to a headend which distributes analog program signal to at least one subscriber. The headend receives an encoded digital program signal in the digital data stream from the service provider and decrypts the digital program signal therefrom. The digital program signal includes an audio and a video portion. The video portion of the signal is scrambled by a scrambler. The digital audio portion of the digital program signal and scrambled video portion of the digital program signal are converted to an analog program signal and transmitted to one or more subscribers.

31 Claims, 3 Drawing Sheets

5,920,626

ANALOG/DIGITAL SYSTEM FOR TELEVISION SERVICES

FIELD OF INVENTION

The invention generally relates to a combined analog/digital system and, more particularly to a system for delivering television services internationally.

BACKGROUND OF INVENTION

There are more than 600 million television households outside of Europe and North America. A large potential market exists with this vast population for television services, such as pay television services including pay-per-view. Pay television is undergoing exponential growth in, among other places, Latin America, Asia, and Eastern Europe.

Currently, less than 5% of the international television households can be reached by pay television services. The fact that so few successful pay television systems exist internationally indicates that there are significant problems in reaching this market. The problems involved in delivering pay television services internationally include programming and rights availability, government regulation, local marketing of services, collection of fees, etc. Among these problems is the lack of an available, secure and cost-effective signal delivery method.

In the pay television industry, programmers produce programs for distribution to various remote locations. A program may include video, audio, and other related services, such as closed-captioning and teletext services. Typically, a programmer will supply these services via a satellite to individual subscribers and/or cable television operators. In the case of cable television operators, the services transmitted via a satellite are received at the operator's cable headend installations. A cable operator typically receives programs and other services from many programmers and then selects the programs/services it wishes to distribute to its subscribers. In addition, a cable operator may insert locally produced services at the cable headend. The selected services and locally produced services are then transmitted to the individual subscribers via a coaxial cable distribution network. In the case of DBS (direct broadcast satellite) subscribers, each subscriber receives a satellite downlink from the programmers directly. In the past, pay television systems, including cable and DBS systems have operated in the analog domain. Recently, however, the pay television industry has begun to move toward hybrid and all digital systems wherein, prior to transmission, all analog signals are converted to digital signals. Digital signal transmission offers the advantage that digital data can be processed at the transmission end and the receiving end to improve picture quality. Further, digital data compression techniques have been developed that achieve high signal compression ratios. Digital compression allows a larger number of individual services to be transmitted within a fixed bandwidth. Bandwidth limitations are imposed by both satellite transponders and coaxial cable distribution networks, and therefore digital compression is extremely advantageous.

Existing methods to deliver pay television services internationally have inherent weaknesses. The ideal way to deliver pay television is via cable television (CATV). However, CATV cannot reach enough television households in the immediate future because of the time, cost, and risk involved in building a CATV plant. The financial risk associated with building a CATV plant is directly related to the regulatory environment in a given region/country and the availability of "franchises." Franchises guarantee the possibility of a return in an area where the CATV operator has at least a near-monopoly. Few international areas have regulatory and political environments with sufficient stability to assure the return on investment which CATV plant construction requires.

Another alternative for delivering pay television services is direct-to-home (DTH) television (i.e., direct tv). For either analog or digital DTH delivery, the high entry cost for the subscriber ($500 to more than $1000) and the troublesome logistics of installing satellite dishes at individual subscribers' homes severely limits the market. It is no accident that only a handful of DTH businesses exists worldwide, and that few, if any, have been profitable. DTH is also inherently inefficient in a multiple dwelling unit (MDU) environment where each unit requires its own dish. It would be far more practical to use a single digital decoder which can serve many units in the MDU simultaneously, significantly reducing the cost of delivery.

A subscriber satellite television system (STV) has proven to be viable as a regional pay television vehicle using broadcast ultra high frequency (UHF) spectrum, but only in the absence of other effective pay television competition. For example, in France, Canal+has in effect a regulated monopoly on pay television services, and has reached four million subscribers out of twenty million. However, STV has a severely limited bandwidth, and is subject to availability of the broadcast VHF/UHF frequencies. STV cannot survive DTH or CATV competition in the long term and is therefore impractical.

Another option for delivering pay television services is multi-channel, multi-point distribution service (MMDS). MMDS has the distinguishing feature of being much more rapidly deployable than CATV and less bandwidth limited than STV. Multi-point distribution services are analogous to over-the-air CATV networks. Satellite broadcasts received at a central facility are retransmitted within the 2150 to 2162 and 2500 to 2680 MHZ frequency bands to small roof-top antennas in the vicinity. Each subscriber antenna must have a clear line-of-sight view of the transmitting antenna because trees, buildings and other obstructions strongly absorb the microwaves. MMDS can be used for relaying movies and other pay-per-view programs to hotels and apartment complexes. In hotels, guests can simply call the main desk to view a movie or special event. Apartment or condo dwellers typically pay a set fee per month to view MMDS television.

MMDS is a feasible concept and a method of signal delivery that is widely deployed internationally. However, in markets which predominantly include television households in MDUs and where satellite programs are available, MMDS is essentially a redundant and unnecessary terrestrial redistribution step. In these MMDS systems, there is no need to have multiple antennas to serve many customers located in close proximity such as in the same MDU. Furthermore, MMDS has significant limitations in terms of line-of-sight reach, picture quality due to reflections and ghosting, and the need for transmitter site real-estate.

The most cost-effective signal delivery system for international pay television services is satellite master antenna television (SMATV). Several considerations lead to this conclusion. International population density is high and the majority of international television households are in MDUs. Moreover, the disposable income of the international population is low and a significant percentage of people cannot afford single family dwellings, even if sufficient space exists to build such dwellings.

Presently, most MDUs are already served by master antenna television (MATV) and SMATV systems. Master antenna television systems use one or more high quality centrally located antennas which relay television signals to many televisions in a local apartment/condo or group housing complex. Thus, many MDUs are cabled, at minimum, for redistribution of off-air programming (MATV) and increasingly for in-the-clear satellite programming (SMATV). SMATV systems cost less to build per subscriber than the other television service delivery methods. Typically, international SMATV systems can be built for less than $100 per home passed (depending on the number of homes served) compared with, for example, CATV which costs between $500 and $1000 per home passed excluding subscriber equipment.

However, SMATV is not ideally suited for delivering pay television services with current delivery systems. For example, SMATV systems are good for delivering signals in the clear, but they are not normally used to deliver premium "pay-tv" services. In particular, existing SMATV systems are too small to afford secure addressable scrambling systems. Furthermore, pay-tv operators lose control in the SMATV environment. Existing SMATV systems force pay-tv operators to deal with SMATV operators as bulk redistributors of programming in-the-clear which significantly reduces the pay-tv operators' ability to control their programming.

Accordingly, there is a need to provide a cost-effective signal delivery system for television services on an international scale. More specifically, there is a need to provide a method of bypassing the SMATV headend and to inexpensively provide security and addressability thereby giving control of programming to the pay-tv operator.

SUMMARY OF THE INVENTION

The present invention overcomes many of the aforementioned problems associated with conventional methods of providing television services internationally. In particular, the present invention provides a secure, cost-effective way to deliver television services, such as pay television services, internationally. The present invention provides a combined analog/digital system for use with a television redistribution system such as SMATV which can combine the benefits of lower cost analog settop terminals and more efficient satellite delivery systems using digital compression.

The combined analog/digital system is secure as any existing pay television delivery method. Also, the combined analog/digital system according to the present invention is cost effective primarily because it can implement low cost SMATV distribution in combination with inexpensive analog settop terminals. Moreover, the combined analog/digital system can be implemented quickly because it is based mostly on existing technology.

Also, the present invention saves transponder space by sending compressed video via a satellite. At the headend, the compressed digital video signal is decompressed, descrambled, and converted to an analog signal. The analog signal is then scrambled and sent to the subscribers.

An integrated receiver descrambler (IRD) and scrambler/modulator are combined to form a single device and provide all these functions according to the present invention. For SMATV systems, decompression and scrambling occurs at the headend and the resulting scrambled analog signal is put on the SMATV transmitter. For MMDS systems, all that is needed at the subscriber's location is an analog settop and an antenna at the television household or at the MDU. By implementing the combined IRD scrambler/modulator in an SMATV system, the same benefits which occur in MMDS can be achieved.

By implementing a combined IRD scrambler/modulator, the present invention achieves several benefits. All the data manipulation can be centralized at a service provider or satellite uplink facility. Consequently, the present invention reduces the cost of the headend and the total cost of delivering video over the satellite and final distribution link. In prior art systems, the IRD, the scrambler and the modulator are separate so that the satellite signal must be decoded and converted to baseband and transmitted in the clear to the scrambler. Thus, conventional decoders generate a clear baseband signal, that is a composite video signal, for example, an NTSC or PAL output signal. One of the pitfalls with the conventional systems is that headend operators can "steal" the clear baseband signal and redistribute the video signal over the air; the clear signal is not scrambled. In contrast, the combined IRD scrambler/modulator gives the service providers (e.g., pay-tv operators) the ability to better control unauthorized distribution of their product.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION

The present invention is discussed below with reference to pay television services, although the same principles can easily be applied to any type of communication service distributed on a local, national or global scale.

An information distribution system provides a mechanism, whereby data, such as compressed video data from a service provider is transmitted over a broadband network to a subscriber for presentation to a subscriber's settop unit. A settop unit can refer to any subscriber device capable of receiving and decoding services, such as personal computers, home control terminals, decoders and the like. Information such as video services received by a subscriber can be displayed on, for example, the subscriber's television or computer screen. A bidirectional path between the service provider and subscriber can be used to allow the customer to interact with the service provider by, for example, selecting pay television services from a menu, controlling the playback of a program or interacting with a video game.

Figure 1:
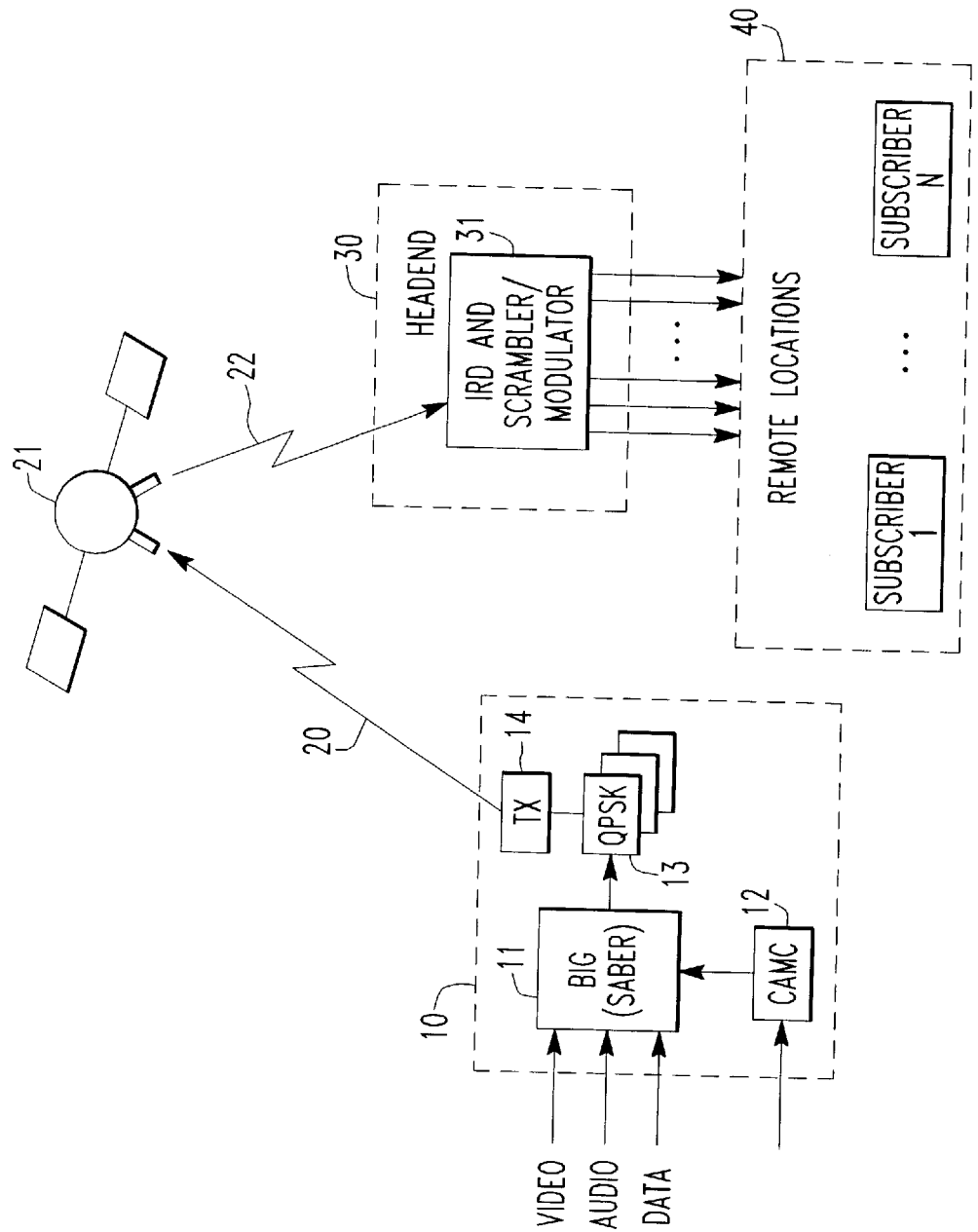
FIG. 1 shows an illustrative distribution system according to the present invention.

FIG. 1 shows a system for distribution of pay television services according to an exemplary embodiment of the present invention. A system similar to the distribution system of the present invention can be found in co-pending, commonly assigned application Ser. No. 08/580,759, filed Dec. 29, 1995, and entitled "Method and Apparatus For Providing Conditional Access in Connection-Oriented, Interactive Networks with a Multiplicity of Service Providers," which is hereby incorporated by reference, now U.S. Pat. No. 5,870,474.

Programs comprising a collection of services such as video, audio, and data (e.g., teletext, closed captioning and other services) are communicated from at least one of the service providers to a plurality of subscribers in remote locations 40 via satellite 21 and headend 30. A number of service providers may be present in a distribution system. Service providers 10 provide "programs" for distribution to various subscribers at remote locations 40. Each program includes a collection of related services, such as video, audio, teletext, data and closed captioning services. Service providers 10 can provide any number of programs.

According to an illustrative embodiment, service providers 10 may have several elements including a broadband integrated gateway (BIG) and service access broadband encrypter re-mapper (SABER) 11, conditional access management control (CAMC) 12, a quadrature phase shift keying section (QPSK) 13, and a transmitter (TX) 14. Program information can be stored on file servers (not shown) in the form of Moving Picture Expert Group (MPEG-2) Systems transport packets, which contain compressed video, audio and data, generated on real time encoders or otherwise stored or generated as known in the art. The MPEG-2 transport packets have been defined in MPEG-2 Systems International Standards Reference (ISO/IEC JTC1/SC29/WG11 N0801, November 1994, ISO Reference No. 13818-1), which is hereby incorporated by reference. Desired video, audio and data information (e.g., requested by a subscriber) is input to the BIG SABER 11 in the form of MPEG-2 transport packets encapsulated in a network protocol.

Service providers 10 may want to ensure that programs distributed over the system are only available to authorized subscribers. SABER 11 and CAMC 12 can add conditional access to programs which will be transmitted. The SABER 11 receives the MPEG-2 transport packets encapsulated in the network protocol and extracts the MPEG-2 transport packets. Next, the SABER 11 adds conditional access to the MPEG-2 transport packets and re-encapsulates the packets in a second protocol which may be the same or different from the first protocol. CAMC 12 provides SABER 11 with information necessary to selectively apply conditional access encryption to the MPEG-2 transport packets. Service providers 10 provide CAMC 12 with conditional access requirements and unique program identification assignments for the requested programs.

Conditional access layers are added to the MPEG-2 transport packets by SABER 11 in conjunction with CAMC 12. SABER 11 and CAMC 12 coordinate the process of adding conditional access to the transport packets via a link for example an Ethernet link. Generally, the process entails encrypting the contents of transport packets and corresponding keys and ensuring that this information is provided to the decrypting device at the receiver. CAMC 12 keeps track of program level information (e.g., program id maps and higher levels of encryption keys) which it periodically provides to SABER 11. Additionally, CAMC 12 periodically generates other data (e.g., system-wide pay-per view access, copy protection information, and the like) that it must deliver to subscribers at remote locations 40. That information is placed in Entitlement Control Messages (ECM) and Entitlement Management Messages (EMM) carried in MPEG-2 transport packets which are multiplexed into the stream of program bearing MPEG-2 packets. The packets generated by CAMC 12 are transmitted to remote locations 40 via SABER 11, where they are mapped into the appropriate network layer protocol. ECM messages are used to transmit control words along with authentication information, such as a message authentication code. An EMM message is addressable to one or a group of individual decoders, and contains an encryption key for ECM and a digital signature as well as other information, such as address and message length, to authorize the decoder to decrypt the data packets. For more details, see U.S. Pat. No. 5,870,474, where an exemplary implementation of a conditional access model including a SABER and CAMC usable with the present invention is described and includes a hardware level description of implementation details. Also, a method for providing conditional access information is described in more detail in commonly assigned U.S. Pat. No. 5,420,866, which is hereby incorporated by reference.

Conditional access may be inserted at the uplink as described to, for example, achieve national or international addressability. Also, conditional access data may be inserted at the headend for local addressability.

Each MPEG-2 transport data packet forms part of a multiplexed data stream of compressed digital information which is passed by the SABER 11 to quadrature phase shift keying (QPSK) section 13 for modulation. Other known types of modulation may be employed such as quadrature amplitude modulation (QAM). The modulated data stream is provided to transmitter 14 and then to a satellite uplink 20. Each multiplexed data stream is transmitted via satellite 21 to a cable headend 30, at for example 24 or 30 MHZ.

It is understood that there may be many service providers in a system according to the present invention, and therefore, a plurality of multiplex data streams may be transmitted via satellite 21 to cable headend installations such as cable headend 30. A satellite downlink 22 at cable headend 30 provides a series of data streams to one or more integrated receiver decoder (IRD) scrambler/modulators 31. The multiplexed compressed digital data stream (MPEG transport stream (TS)) is processed at headend 30 by the IRD scrambler/modulator 31. IRD scrambler/modulator 31 produces a series of analog scrambled video signals which are transmitted to a plurality of subscribers at remote locations 40. The number of scrambled analog video signals produced by IRD scrambler/modulator 31 is based on the bandwidth. For example, ten outputs of scrambled analog video signals may be appropriate for a bandwidth of 60–80 MHZ. As those skilled in the art are aware, cable headends provide pay television signals to cable subscribers via a cable distribution network. Coaxial cables typically used in cable television networks have the capacity to carry a plurality of contiguous 6, 7, or 8 MHZ channels. Alternatively, the headend can be in wireless communication with remote locations 40, for example in an MMDS.

Figure 2:
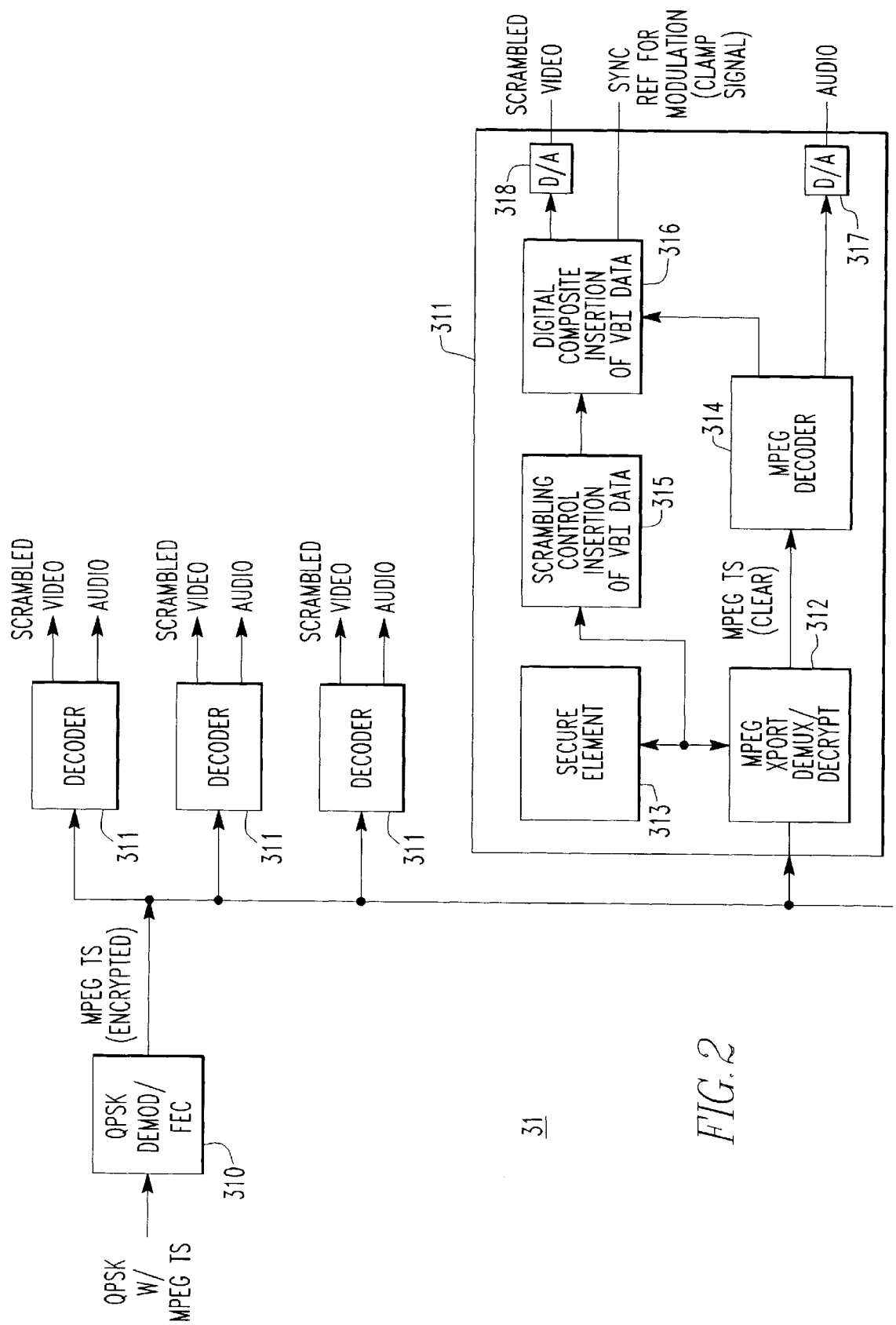
FIG. 2 shows an illustrative IRD scrambler/modulator according to the present invention.

FIG. 2 shows an illustrative IRD scrambler/modulator according to the present invention. Referring to FIG. 2, the MPEG TS undergoes demodulation and forward error correction in QPSK demod/fec section 310. Thus, QPSK demod/fec section 310 outputs the MPEG TS with only the encryption provided at service providers 10. That is, encrypted MPEG-2 digital and audio signals are input to plural decoders 311. Decoders 311 each receive the MPEG TS, and decode selected encrypted MPEG-2 transport packets therein and generate a respective audio and a scrambled video signal. Encrypted information is only decrypted by authorized decoders.

MPEG xport demultiplexer decryptor 312 in decoder 311 demultiplexes and decrypts a portion of the MPEG TS and outputs the MPEG TS portion in the clear. The clear MPEG TS is then forwarded to MPEG decoder 314 which recovers and separates the digital video and audio portions of the MPEG TS. The audio portion is then forwarded to a digital to analog (D/A) converter which converts the digital audio signal to an analog audio signal. The digital video signal is input to composite encoder 316.

Secure element 313 contains the particular decryption key(s) for decryption and supplies an authorized key(s) to MPEG xport demultiplexer decryptor 312 to decrypt the particular message in the MPEG TS (e.g., the audio and video portions) authorized for decryption. Secure element 313 also has access to the appropriate key(s) for scrambling of the video signal and provides the encryption information to scrambling control and VBI (vertical blanking interval) insertion section 315. Secure element 313 is provisioned for the channels and information desired, so it knows which packets to demultiplex from the MPEG TS. The secure element 313 receives instruction in the form of EMMs, ECMs, or MPEGPSI (program specific information) from the satellite uplink facility. The instructions may include information related to the ECMs associated with the program bearing MPEG-2 transport packets. Secure element 313 performs the decryption of the control words carried in the ECMs and verifies that the appropriate headend decoder 311 and associated subscribers are authorized to receive the transmitted information received via the satellite. Secure element 313 also decrypts MPEG private data, which includes VBI type data.

The decrypted MPEG private data along with scrambling control data is passed to the scrambling control and VBI insertion section 315. The scrambling control data originates from the same place as the ECMs. The data inserted into the VBI includes, among other things, addressable messages for selected subscriber settops, global messages, and scrambling control data for controlling scrambling. The VBI data can include pass through data from service providers 10 and/or data generated locally at headend 30 and inserted separately if local scrambling control is desired. All types of known scrambling techniques can be used including, but not limited to, video inversion, sync suppression, split sync, and others.

The scrambling control and VBI data for insertion is sent to digital composite encoder 316 where it is mixed and combined with the digital video signal. Digital composite encoder 316 outputs a scrambled digital video signal which is forwarded to D/A converter 318. D/A converter 318 converts the scrambled digital video signal to a scrambled analog video signal which is modulated and transmitted to one or more subscribers at remote locations 40. Digital composite encoder 316 also generates and outputs a sync reference (e.g., a clamp signal) for modulation. The digital composite encoder 316 may include vestigial sideband modulation functionality and incorporate the function of RF modulation.

Figure 3:
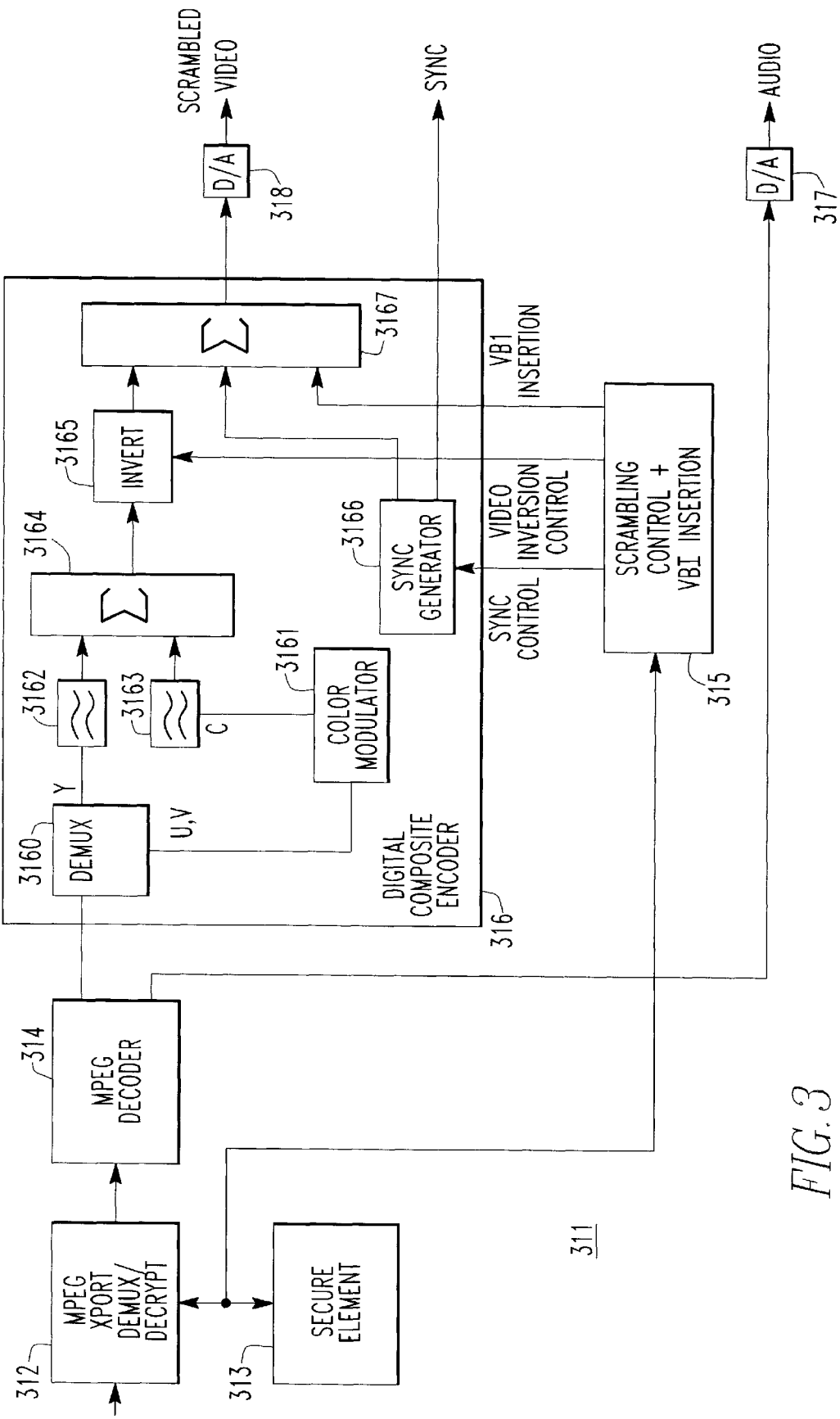
FIG. 3 shows an illustrative portion of a decoder in an IRD scrambler/modulator according to the present invention.

FIG. 3 provides a more detailed representation of decoder 31 of FIG. 2 and in particular, a more detailed representation of digital composite encoder 316. Referring to FIG. 3, the video output of MPEG decoder 314 is passed to demux 3160 of digital composite encoder 316 which separates the y and u, v portions of the video signal. The y portion is passed to filter 3162, which filters the signal. The filtered signal is sent to combiner 3164. The u, v portions of the video signal are passed to color modulator 3161, which modulates these signals and generates a c signal. The c signal undergoes filtering at filter 3163, and is then forwarded to combiner 3164. Combiner 3164 forms a video signal and passes the same to scrambling video inversion section 3165.

Scrambling control and video inversion section 315 provides scrambling control, and in particular video inversion control data to video inversion section 3165. Video inversion section 3165 scrambles the video signal and outputs the scrambled video signal to combiner 3167. It is to be understood that video inversion is merely an illustrative scrambling technique and that other known techniques may be employed. Thus, secure element 313 and scrambling control and video inversion section 315 can be configured to generate the desired type of scrambling information depending on the desired scrambling technique.

The data for VBI insertion is forwarded by scrambling control and VBI insertion section 315 to combiner 3167 in digital composite encoder 316. Scrambling control and VBI insertion section 315 also provides sync control (e.g., suppression, inversion, split sync) to sync generator 3166 in the digital composite encoder 316. The sync generator 3166 generates the sync reference for modulation and also provides sync to combiner 3167 for combining the components of the video signal.

Combiner 3167 combines the various portions of the video signal provided thereto and generates an encoded or scrambled digital composite signal. The scrambled digital composite signal is converted to a scrambled analog video signal for transmission to remote locations 40. All the scrambling is performed in the digital domain prior to conversion of the signal to analog. Thus, analog scrambling is accomplished by processing the signal in the digital domain before converting to analog resulting in an analog scrambled video signal.

While the above embodiment is described with respect to VBI data insertion, there are other ways to convey information in-band and out-of-band known to those skilled in the art which, although not described, can be applied in the present invention.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A headend apparatus for receiving a digital data stream including services from a service provider and transmitting the services to at least one subscriber, said apparatus comprising:

a demodulator, located in a headend, for receiving and demodulating the digital data stream;

a decoder, integrated and combined with said demodulator, including,
a decryptor for decrypting a digital signal in the digital data stream,
a video/audio decoder for recovering a video portion and an audio portion from the decrypted digital signal,
an encoder including a scrambler for scrambling at least a portion of the video portion of the decrypted digital signal, and
a digital to analog converter for converting the decrypted digital signal including the scrambled portion to an analog signal including the scrambled portion; and a transmitter, integrated and combined with said demodulator and said decoder, for transmitting the analog signal to said at least one subscriber.

2. The headend apparatus according to claim 1, wherein said decoder further comprises a scrambling control circuit for generating scrambling control information and providing the scrambling control information to said scrambler.

3. The headend apparatus according to claim 2, wherein said scrambling control circuit generates sync control information and data to be inserted in a vertical blanking interval of the video portion of the decrypted digital signal, the sync control information and data being provided to said scrambler.

4. The headend apparatus according to claim 2, wherein said scrambling control circuit generates sync control information, and said encoder further includes a sync generator for generating a sync signal based on the sync control information.

5. The headend apparatus according to claim 2, further comprising a secure element for providing decryption information to said decryptor and for providing encryption information to said scrambling control circuit.

6. The apparatus according to claim 5, wherein the encryption information includes subscriber authorization data.

7. The headend apparatus according to claim 1, wherein said transmitter transmits the analog signal over SMATV.

8. The headend apparatus according to claim 1, wherein said transmitter transmits the analog signal over cable.

9. The headend apparatus according to claim 1, wherein said transmitter transmits the analog signal over MMDS.

10. The headend apparatus according to claim 1, wherein said transmitter transmits the analog signal over satellite.

11. A service distribution system comprising:

a service provider for providing program information in a digital program signal and transmitting the digital program signal in a digital data stream;

a headend for receiving the digital data stream, said headend including a combined integrated receiver decoder and scrambler/modulator for receiving and decoding the digital program signal from the digital data stream, the digital program signal including an audio portion and a video portion, said combined integrated receiver decoder and scrambler/modulator scrambling a portion of at least the video portion of the digital program signal and then converting the digital program signal to an analog program signal, the analog program signal including the scrambled portion, and transmitting the analog program signal; and at least one subscriber station for receiving the analog program signal.

12. The service distribution system according to claim 11, wherein said combined integrated receiver decoder and scrambler/modulator includes:

a demodulator for demodulating the digital data stream;

a decoder including, a decryptor for decrypting the digital program signal in the digital data stream, a video/audio decoder for recovering the video portion and the audio portion from the decrypted digital program signal.

an encoder including a scrambler for scrambling a portion of at least the video portion of the decrypted digital program signal, and a digital to analog converter for converting the decrypted digital program signal including a scrambled portion to the analog program signal including a scrambled portion, and a transmitter for transmitting the analog program signal to said at least one subscriber.

13. The service distribution system according to claim 12, wherein said service provider includes conditional address control for adding subscriber authorization data to the program information in the digital program signal, wherein said at least one subscriber receives the analog program signal in accordance with the subscriber authorization data therein.

14. The service distribution system according to claim 13, wherein said decoder further comprises a scrambling control circuit for generating scrambling control information and providing the scrambling control information to said scrambler.

15. The service distribution system according to claim 14, wherein the scrambling control circuit generates sync control information and data to be inserted in a vertical blanking interval of the video portion of the decrypted digital program signal, the sync control information and data being provided to said scrambler.

16. The service distribution system according to claim 12, wherein said combined integrated receiver decoder and scrambler/modulator further comprises a secure element for providing decryption information to said decryptor and for providing encryption information to said scrambling control circuit.

17. The service distribution system according to claim 16, wherein the encryption information includes subscriber authorization data.

18. The service distribution system according to claim 11, wherein said headend transmits the analog program signal to said at least one subscriber station over SMATV.

19. The service distribution system according to claim 11, wherein said headend transmits the analog program signal to said at least one subscriber station over cable.

20. The service distribution system according to claim 11, wherein said headend transmits the analog program signal to said at least one subscriber station over MMDS.

21. The service distribution system according to claim 11, wherein said headend transmits the analog program signal to said at least one subscriber station over satellite.

22. A method for transmitting program information from a service provider to at least one subscriber comprising the steps of:

transmitting program information in a digital program signal from a service provider to a headend, the digital program signal being transmitted as part of a digital data stream;

receiving and decoding the digital program signal from the digital data stream, the digital program signal including an audio portion and a video portion;

scrambling at least a portion of the video portion;

converting, after said scrambling, the digital program signal to an analog program signal, the analog program signal including the scrambled portion; and transmitting the analog program signal to at least one subscriber station.

23. The method according to claim 22, further comprising the step of generating scrambling control information from encryption information and using the scrambling control information to scramble the video portion of the digital program signal.

24. The method according to claim 22, further comprising the step of generating sync data and data to be inserted in a vertical blanking interval of the video portion of the digital program signal.

25. The method according to claim 22, wherein the encryption information includes subscriber authorization data.

26. The method according to claim 22, further comprising the step of adding subscriber authorization data to the program information in the digital program signal at the service provider, wherein said at least one subscriber receives the analog program signal in accordance with the subscriber authorization data.

27. In a combined receiver/decoder and scrambler/modulator located in a headend of a distribution system, a method for facilitating distribution of services from a service provider to at least one subscriber, said method comprising the steps of:

demodulating a digital data stream;

decrypting a digital signal in the digital data stream;

recovering a video portion and an audio portion from the decrypted digital signal;

scrambling at least a portion of the video portion of the decrypted digital signal;

converting, after said scrambling, the decrypted digital signal to an analog signal, the analog signal including the scrambled portion; and transmitting the analog signal to said at least one subscriber, wherein the demodulating, decrypting, recovering scrambling and converting steps are performed in the combined receiver/decoder and scrambler/modulator.

28. The method according to claim 27, wherein said step of transmitting includes transmitting the analog signal over SMATV.

29. The method according to claim 27, wherein said step of transmitting includes transmitting the analog signal over cable.

30. The method according to claim 27, wherein said step of transmitting includes transmitting the analog signal over MMDS.

31. The method according to claim 27, wherein said step of transmitting includes transmitting the analog signal over satellite.

* * * * *